Patented Jan. 29, 1952

2,583,545

UNITED STATES PATENT OFFICE 2,583,545

ANTIFOULING MARINE PAINT

John S. Cameron, Compton, Calif., assignor of one-half to Morton E. Feiler, Los Angeles, Calif.

No Drawing. Application July 21, 1948,
Serial No. 40,023

4 Claims. (Cl. 106—15)

The present invention relates to a new and improved anti-fouling marine paint composition for application to the hulls of ships and the like, both to repel therefrom marine organisms such as barnacles, and the like, and to prevent permanent adherence thereto of marine vegetable growths.

The art to which the present invention pertains is a very old one. Indeed, it might well be designated as an "ancient" one. Those familiar with boating or sailing appreciate the everpresent problem of barnacle and/or marine vegetable growth on the hulls of ships. In larger vessels, this is an economic problem of the first magnitude, because these growths are such that appreciable weight is added to the vessel and relatively more fuel is necessary to propel the vessel through the water when it is weighted down with this material.

Because of this long-standing problem, there are thousands of patents and literature references proposing coating compositions designed to combat this barnacle problem. It is safe to say that practically all of the prior proposals proceeded on the premise that barnacles and vegetables growth could be killed by applying to the hull of the vessel a coating composition containing one or more poisonous substances. This line of attack has been followed for perhaps three or four hundred years, yet no one has ever produced a foolproof paint designed for preventing barnacle and vegetable growth. Anti-fouling coating compositions of the prior art containing these poisons have been failures because, as the embryonic barnacle does not eat for the first three weeks of life, any toxic effectiveness of the poisons in actually killing the barnacles when reaching the eating stage will be nullified because the shell of the barnacles will remain attached to the surface of the hull, thus to provide an ideal form of anchorage to which other barnacles readily attach themselves as the natural effort to colonize on the hull continues.

Thus, toxic compositions of the prior art, even if initially effective, utterly fail to prevent the progressive fouling of the hull by the constantly increasing colony of barnacles and barnacle shells.

It is the principal object of the present invention to provide an anti-fouling marine paint composition which actually repels barnacles from the hull and positively prevents the barnacles from adhering to the hull so that there will be absolutely no accumulation of such animal marine growth on the hull, with the result that the hull will remain clean and free of growths whose presence so seriously reduce the progress of the vessel through the water.

Another object of the invention is to provide an anti-fouling marine paint of the foregoing character whose ingredients inter-react in the presence of sea water to form on the exposed surface of the coating a temporary, loosely attached, metallic soap film, hereinafter designated as a primary soap film, which film is continuously formed to build up a heavy scum or protecting film.

A further object is to provide an anti-fouling marine paint, the ingredients of which are such that this primary soap film is continuously supercharged with electrical ions serving to irritate the delicate antennae of barnacles when in the microscopic or embryonic stage, so that these minute organisms will be effectively repelled from such an unnatural environment and thus be precluded from becoming attached to the hull.

A further object is to provide an anti-fouling marine paint whose ingredients are such that a voltaic action is continuously set up and imparted to the primary soap film, and which voltaic action will be maintained by a sloughing off of the film to expose new primary, cell-forming, metallic particles at a controlled slow rate until the electrical activity of the composition is finally exhausted.

A further object is to provide an anti-fouling marine paint of the foregoing character, which gives rise to a primary soap film which is built up or renewed during the life of the coating, and which is of sufficient thickness to prevent penetration by vegetable marine growth, so that any such vegetable marine growth which might become attached to the coating during the period the vessel is in port, will adhere only to the film and will be caused to be torn off or sloughed away with the film when the vessel is under way, thus leaving the surface of the coating clean.

A further object of the invention is to provide a repelling composition for marine growths which can be applied to a hull at any convenient time, as the composition remains inactive with its effectiveness unimpaired by exposure to the air, and until submerged in salt water, and which composition affords a certain amount of protection to the coated vessel from magnetic mines, as well as making the vessel considerably harder to detect on a submarine diaphragm than would a vessel painted in the usual manner.

Still another object of the invention is to provide a method of protecting the metal hull of a vessel from corrosion, electrolysis and from the adherence of marine growths, which comprises the initial coating of the hull with an anti-corrosion composition or paint, followed by an insulating coat to electrically insulate the hull from the galvanic or migratory actions of the acids and metals in sea water and from the metals contained in the growth repelling coating, which is preferably then applied in two coats to complete the protection of the hull.

As pointed out briefly hereinbefore, the composition of the present invention is made up of ingredients so selected as to combat both barnacle and vegetable growth in an entirely new way. Briefly and broadly stated, the composition consists of a pigment portion and a resinous binder. The pigment portion contains finely divided metallic copper, finely divided metallic zinc, cuprous oxide, and mercuric oxide. The ingredients making up this pigment portion are thoroughly dispersed through the resinous binder which is made up of chlorinated coal tar pitch, benzol and zinc resinate. By virtue of thorough dispersion, the finely divided particles of metallic copper and zinc are spaced one from the other by the chlorinated coal tar pitch and, to some extent, by the zinc resinate. By being so spaced, a multiplicity of cells are established and, when in contact with acidulated salt water, serving as an electrolyte, a voltaic current is set up. This voltaic current creates what might be termed "electric turbulence" which is effective to repel living organisms in the salt water such as embryonic barnacles and the like. The setting up of an effective voltaic current is made possible by the inclusion in the composition of chlorinated coal tar pitch which is slightly water-soluble and which, because of the chemical instability thereof, continuously gives off hydrochloric acid to effect an acidic environment adjacent the minute cells.

Another very important feature of the invention is brought about by the inter-reaction, in the presence of acidulated sea water, between certain ingredients of applicant's composition which result in the continuous formation of what is believed to be a soap film. This soap film continuously forms on the main coating film, is loosely attached, and is of a temporary nature. It is designated herein as a primary soap film. This soap film is formed, it is believed, by the reaction between the copper, zinc, cuprous oxide and mercuric oxide with the long chain acids occurring in the chlorinated coal tar pitch. The primary soap film is likewise charged with the voltaic current set up in the main coating film and thus embryonic barnacles are effectively repelled from the film. They do not become attached to the film for the simple reason that they never have a chance to come anywhere near it. Marine vegetable growth, however, may attach itself to the primary film when the vessel is at rest, but since the primary film is so loosely attached to the main coating film, the primary film and any vegetable growth are immediately washed or sloughed away as soon as the vessel is put in motion.

It should be here pointed out that the employment of chlorinated coal tar pitch in the resinous binder is a salient feature of this invention. Chlorinated coal tar pitch is slightly water-soluble and, therefore, when the composition is applied to the hull of a vessel and in contact with salt water, it is slowly disintegrated from the surface of the coating to provide continuous exposure of the finely divided metallic particles making up the multiplicity of voltaic cells. At the same time, because of its instability, it continuously gives off hydrochloric acid to effect acidic environment adjacent the minute cells and enhance voltaic action. Chlorinated coal tar pitch is unstable with respect to its chemical constituency and for this reason it will give off hydrochloric acid to effect an acidic environment adjacent the minute voltaic cells. While chlorinated coal tar pitch is made up substantially entirely of various aromatic compounds, it is believed that some of these compounds, at least, have attached thereto long chain radicals such as stearic acid and palmitic acid radicals. It is the presence of these long chain acid radicals in the chlorinated coal tar pitch which probably gives rise to the formation of the primary soap film hereinbefore mentioned. It is believed, in other words, that the metallic and oxide constituents of the pigment react with these long chain radicals to form the primary soap film. Regardless of the chemical make-up of this film, it does form continuously on the coating and functions in a manner hereinbefore described. Accordingly, the invention is not limited with respect to theory of make-up of this primary soap film.

For the foregoing reasons, it will be appreciated that chlorinated coal tar pitch has properties peculiarly adapted for the production of the anti-fouling marine paint of this invention and is not to be confused with other materials employed in the prior art, such as the so-called "waterproof" varnishes used for this purpose. In particular, chlorinated coal tar pitch is not to be confused with chlorinated rubber. The two are not equivalent in any way. In chlorinated coal tar pitch, the chlorine is rather loosely attached by way of substitution, whereas the chlorine in chlorinated rubber is very firmly attached to the rubber molecules by addition to the double bond. Chlorinated coal tar pitch is slightly water-soluble and is therefore admirably suited for the purpose of this invention, whereas chlorinated rubber is absolutely water-insoluble and for this reason alone would be inoperative in the present composition. Being water-insoluble, the surface of a film of this character, employing chlorinated rubber as a binder, would not be gradually dissolved away from the sea water to present new metallic surfaces to perpetuate the voltaic action. Should chlorinated rubber be employed, voltaic action might be set up temporarily but would soon stop when the limited number of metallic particles at the surface of the coating had been used up. Furthermore, because of its great stability, chlorinated rubber in the environment under consideration would not give up hydrochloric acid adjacent the voltaic cells to greatly augment the voltaic action.

The pigment materials employed herein, namely, the finely divided copper and zinc particles as well as the cuprous oxide and mercuric oxide are not to be confused with amalgams or alloys of the prior art which are inoperative in setting up the voltaic action disclosed herein.

The pigment of the present invention is preferably formulated in accordance with the following formula:

| | Pounds |
|---|---|
| Electrolytic copper, 160 mesh | 2½ |
| Metallic zinc, 900 mesh | ¾ |
| Cuprous oxide | ½ |
| Mercuric oxide | ¼ |

The vehicle or binder is preferably comprised of resinous materials of a pyrogenous origin, having high dielectric strength and whose general characteristics are obnoxious to those marine growths that attach themselves to the hulls of ships.

In making up the resinous binder, coal tar pitch having a melting point between 160 and 200 degrees Fahrenheit is first placed in solution with a mixture of a coal tar hydrocarbon solvent, an aromatic solvent such as benzol, and an aromatic of petroleum origin. The benzol preferably employed is specifically a fast aromatic petroleum solvent with a low initial boiling point of about 190 degrees F. and an end point of approximately 270 degrees F.

This mixture is chlorinated by introducing chlorine gas under pressure into the mass in amounts varying from one to fifteen per cent, the chlorine permeating the mass and combining therewith. Zinc resinate is added to the chlorinated mixture to produce a resinous binder vehicle of the following preferred formula:

| | Percent by weight |
|---|---|
| Chlorinated coal tar pitch | 40 |
| Benzol T. S. #11 | 50 |
| Zinc resinate | 10 |

Just prior to use, the pigment is added to the vehicle and mixed thoroughly therewith in the preferred proportion of approximately one part of pigment to two parts of the vehicle, specifically 4 pounds of pigment to 8.37 pounds of vehicle to make a predetermined quantity of one gallon and 28 ounces.

The resulting composition is then brushed or otherwise applied in two coats to the hull of a vessel, following prior application of the anti-corrosive and insulating coats in the case of a metal hull. When the hull thus treated is submerged in sea water, a multiplicity of minute primary cells are formed in the coating, as has been pointed out, the metallic copper being the anode and the zinc the cathode. The mercuric oxide acts as a current booster and the resinous vehicle as an insulator between the copper and zinc particles.

The resinous vehicle binder undergoes electrolytic and hydrolytic disassociation liberating hydrochloric acid. The chlorinating treatment of the vehicle serves, in other words, to maintain a high acid condition throughout the life of the coating to insure that the latter will be supercharged with electrical ions that irritate the delicate antennae of barnacles in their microscopic or embryonic state, and thus effectively repel the barnacles.

It is also believed that the zinc resinate reacts, in the acid environment, with the copper, zinc and cuprous oxide, to form what is believed to be a complex metallic coat which builds up and augments the scum or primary film on the surface of the coating. Due to the voltaic nature of the surface it covers, this complex film is also charged electrically to the extent that colonizing attempts of the microscope barnacle will be repelled, all as hereinbefore described.

The primary film which is being built up and formed on the exposed surface of the growth repelling coating, is of such thickness that any vegetable growths which might succeed in adhering to the coating, when the vessel is at anchor, are not able to penetrate the film and are thus limited to becoming attached to the film rather than to the main coating beneath.

Therefore, as the friction exerted upon the film-rooted growths by the water, when the vessel is under way, exceeds the adhesive force which binds the film to the main coating beneath, the growths and the film to which they are attached are separated or torn from the coating, leaving the latter clean and free of the growths. As the primary film is continuously being renewed during the life of the coating, the latter will remain protected against marine growths and will electrically repel the embryonic barnacle.

The improved anti-fouling marine paint composition of the invention is preferably applied in accordance with the following method: First, an anti-corrosive composition or paint, of any conventional and well known constitution, and having maximum corrosion-resisting qualities, is applied to the iron or steel hull of a vessel. Such anti-corrosive composition or paint should also have good affinity for the succeeding coat of insulating composition. This liquid-insulating composition, which is brushed on or otherwise applied to the foregoing coat of anti-corrosive paint, after the latter has become dry, has high electrical insulating properties and preferably contains a synthetic gum such as phenolidene-cumar complex. This insulating coat, which has high water permeability, is thermoplastic, with an affinity for the final anti-fouling marine paint coating and performs the important function of arresting electrolysis by insulating the hull from the galvanic or migratory actions of the acids and metals contained in sea water.

The final step in the method of protecting the hull consists in the application of one or more, preferably two, coats of growth-repelling composition of the invention.

This application is a continuation-in-part of my prior application Serial No. 245,219, filed December 12, 1938, and a continuation of my prior application Serial No. 459,693, filed September 25, 1942, both said applications being abandoned.

I claim:

1. An anti-fouling marine paint adapted for application to the hulls of vessels comprising a pigment including finely divided metallic copper, finely divided metallic zinc and cuprous oxide thoroughly dispersed through and suspended in a vehicle-binder including chlorinated coal tar pitch, the finely divided metallic particles of copper and zinc being insulated one from the other by said pitch to form in the main coating film a multiplicity of primary cells which, in contact with sea water and in the acid environment afforded by the acid nature of said chlorinated coal tar pitch, sets up in the said main coating film a voltaic current effective to repel marine animal growth from said main coating film, said pigment ingredients combining with the long-chain acids of said vehicle-binder to form continuously a primary soap-film loosely attached to said main film, the primary soap-film being likewise charged with voltaic current to repel marine animal growth and being capable of sloughing off from said main film when said vessel is in motion, thus to carry away any marine vegetable growth accumulating on said primary film when the vessel is not in motion.

2. An anti-fouling marine paint adapted for application to the hulls of vessels comprising a pigment including finely divided metallic copper, finely divided metallic zinc, cuprous oxide and mercuric oxide thoroughly dispersed through and suspended in a vehicle-binder including chlorinated coal tar pitch, the finely divided metallic particles of copper and zinc being insulated one from the other by said pitch to form in the main coating film a multiplicity of primary cells which, in contact with sea water and in the acid environment afforded by the acid nature of said chlorinated coal tar pitch, sets up in said main coating film a voltaic current effective to repel marine animal growth from said main coating film, said pigment ingredients combining with the long-chain acids of said vehicle-binder to form continuously a primary soap-film loosely attached to said main film, the primary soap-film being likewise charged with voltaic current to repel marine animal growth and being capable of sloughing off from said main film when said vessel is in motion, thus to carry away any marine vegetable growth accumulating on said primary film when the vessel is not in motion.

3. An anti-fouling marine paint adapted for application to the hulls of vessels comprising a pigment including finely divided metallic copper, finely divided metallic zinc, cuprous oxide and mercuric oxide thoroughly dispersed through and suspended in a vehicle-binder including chlorinated coal tar pitch, benzol and zinc resinate, the finely divided metallic particles of copper and zinc being insulated one from the other by said pitch to form in the main coating film a multiplicity of primary cells which, in contact with sea water and in the acid environment afforded by the acid nature of said chlorinated coal tar pitch, sets up in said main coating film a voltaic current effective to repel marine animal growth from said main coating film, said pigment ingredients combining with the long-chain acids of said vehicle-binder to form continuously a primary soap-film loosely attached to said main film, the primary soap-film being likewise charged with voltaic current to repel marine animal growth and being capable of sloughing off from said main film when said vessel is in motion, thus to carry away any marine vegetable growth accumulating on said primary film when the vessel is not in motion.

4. An anti-fouling marine paint adapted for application to the hulls of vessels comprising approximately one part by weight of a pigment including finely divided metallic copper, finely divided metallic zinc, cuprous oxide and mercuric oxide thoroughly dispersed through and suspended in approximately two parts by weight of a vehicle-binder including chlorinated coal tar pitch, benzol and zinc resinate, the finely divided metallic particles of copper and zinc being insulated one from the other by said pitch to form in the main coating film a multiplicity of primary cells which, in contact with sea water and in the acid environment afforded by the acid nature of said chlorinated coal tar pitch, sets up in said main coating film a voltaic current effective to repel marine animal growth from said main coating film, said pigment ingredients combining with the long-chain acids of said vehicle binder to form continuously a primary soap-film loosely attached to said main film, the primary soap-film being likewise charged with voltaic current to repel marine animal growth and being capable of sloughing off from said main film when said vessel is in motion, thus to carry away any marine vegetable growth accumulating on said primary film when the vessel is not in motion.

JOHN S. CAMERON.

REFERENCES CITED

The following references are of record in the file of this patent:

UNITED STATES PATENTS

| Number | Name | Date |
|---|---|---|
| 682,914 | Coleman | Sept. 17, 1901 |
| 2,364,460 | McLean | Dec. 5, 1944 |

FOREIGN PATENTS

| Number | Country | Date |
|---|---|---|
| 15,829 | Great Britain | of 1901 |
| 423,876 | Great Britain | Feb. 11, 1935 |